Nov. 29, 1960    R. W. KRITZER    2,962,266
AIR CIRCULATING SYSTEM FOR COOLING, DEHUMIDIFYING
AND HEATING INHABITABLE ENCLOSURES
Filed March 25, 1958
FIG. 1
FIG. 2
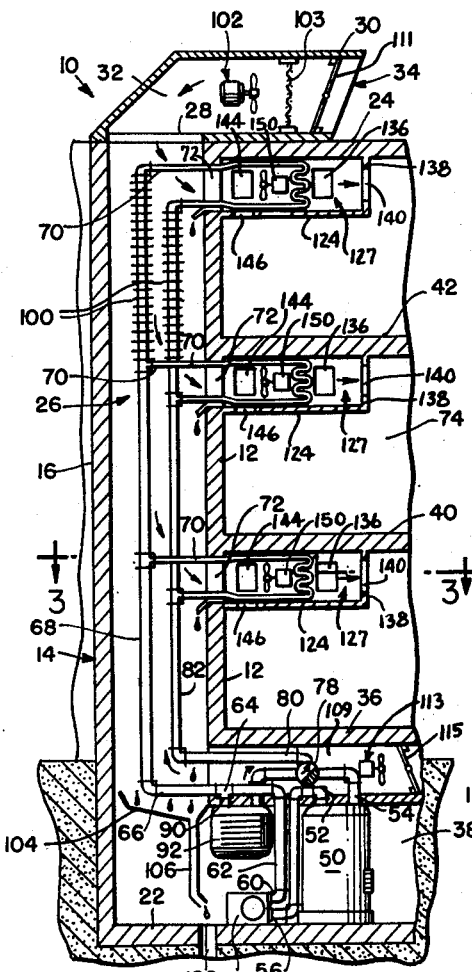
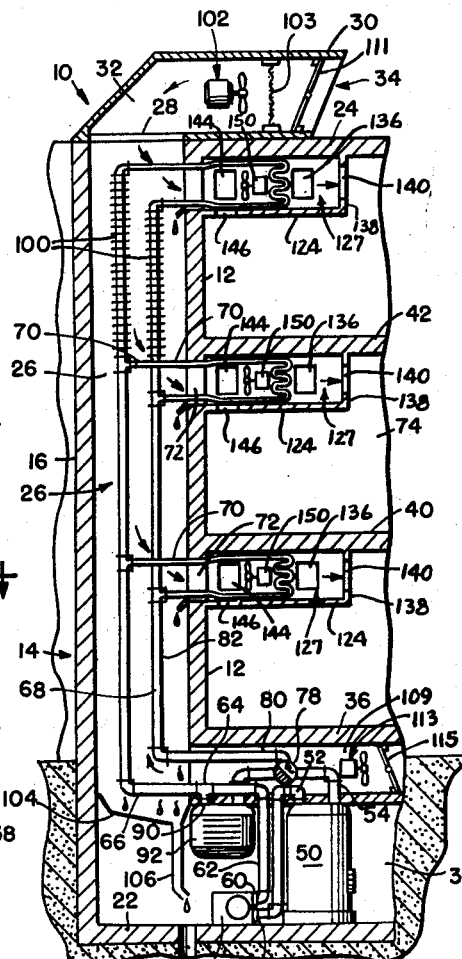
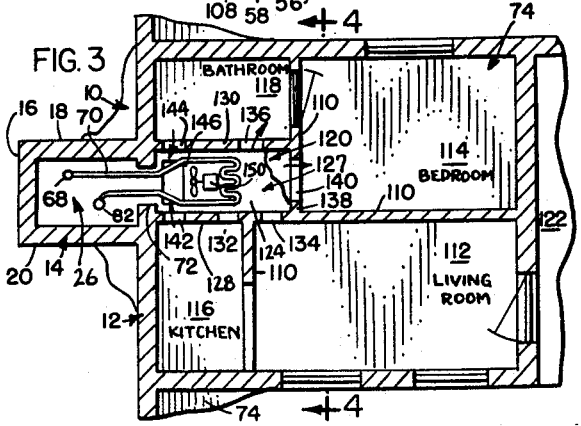
FIG. 3
FIG. 4
INVENTOR:
RICHARD W. KRITZER
BY
ATT'Y

United States Patent Office 2,962,266
Patented Nov. 29, 1960

2,962,266

AIR CIRCULATING SYSTEM FOR COOLING, DEHUMIDIFYING AND HEATING INHABITABLE ENCLOSURES

Richard W. Kritzer, 5830 N. Pulaski Road, Chicago 30, Ill.

Filed Mar. 25, 1958, Ser. No. 723,761

2 Claims. (Cl. 257—297)

The improved air circulating system comprising the present invention has been designed for use primarily in connection with modern apartment buildings, hotels and the like, the present-day architectural trend in designing such buildings being particularly well adapted to accommodate the principles of the invention. The invention is, however, capable of other uses and air circulating and treating systems embodying such principles may, if desired, with suitable modification, be employed for cooling, dehumidifying and heating office buildings, residential buildings, factory buildings, motels, and other inhabitable enclosures where the comfort of human life is to be considered. The invention may also be found useful in connection with the air conditioning of other types of enclosures such as warehouses and other storage spaces, garages and other forms of commercial establishments too numerous to mention. Irrespective, however, of the particular use to which the present invention may be put, the essential features thereof are at all times preserved.

Present-day conventional air cooling and dehumidifying systems, commonly referred to as air conditioning systems, and heating systems, particularly where apartment dwellings are concerned, usually maintain the cooling phase separate from the heating phase and, in connection with the heating phase, the steam or hot water conduits leading from the central heating plant to the various individual apartments are heavily insulated. Modern architectural trends have dictated that the main manifold conduits, i.e., the lead and return water pipes in the case of hot water heating systems, and the steam and condensate return pipes in the case of steam heating systems, pass upwardly through a structural ventilating shaft, originally embodied in the design of the building for light-admitting and ventilating purposes. Invariably, these riser and return conduits are heavily insulated to prevent any heat exchange with the surrounding atmosphere and to thus conserve heat. Such conduits are adapted to function only during the winter months or at such times as the heating system is put into operation and, at other times when the boiler or other heating plant is shut down, these conduits serve no useful purpose. Air cooling and dehumidifying operations in such buildings are ordinarily conducted on the basis of individual, electrically operated, air cooling units disposed within the various inhabitable enclosures or apartments or by a system of chilled air conduits leading from a central air cooling plant and which conduits, in order to be effective, must be relatively large to handle the large volume of air involved. Apart from the initial cost of the insulation and the cost of labor in installing it, such insulated pipe sytems are costly to maintain and operate since there are appreciable heat losses involved in both the heating and cooling phases of operation despite the use of heavy insulation.

The present invention is designed to overcome the above noted limitations that are attendant upon the construction and use of such conventional air conditioning and heating systems and, toward this end, it contemplates the provision of a cooling, dehumidifying and heating system whereby the main manifold conduits or risers which pass upwardly through the ventilating shaft as previously described are caused to function as heat exchange devices both in winter and in summer operation so that they will yield up heat on the one hand during winter operation and absorb heat on the other hand during summer operation whereby, in either instance, the temperature of the surrounding ambient air within the shaft will be affected in a desired manner so that this air may be forcibly impelled into the various inhabitable enclosures or apartments by a novel and effective system of air distribution to thus augment the heating or cooling effect, as the case may be, of certain heat exchange devices which are employed by the system and which are installed directly within the enclosures.

The provision of a heating and cooling system of the character briefly outlined above being among the principal objects of the invention, a further object is to provide such a system wherein the individual heat exchange devices which are installed within the respective enclosures will function selectively both as heating and cooling devices so that no seasonal change-over operations other than simple valve manipulation are necessary.

An additional object of the invention is to provide an air conditioning and heating system which, regardless of whether the system is functioning for summer or winter operation, will maintain the enclosure or enclosures with which it is associated constantly under slight above-atmospheric pressure with either cooled or heated air so that there will be no tendency for infiltration of outside air into the enclosure.

Another object of the invention, in a system of this character, is to provide a heating and cooling system which readily lends itself to design as original equipment in a building undergoing erection without requiring appreciable modification of basic architectural design and which also is applicable to existing buildings without requiring the addition of extensive equipment.

Yet another object of the invention is to provide a system of the character briefly outlined above, which, in the case of apartment buildings, requires no attention whatsoever on the part of the tenant, even during change in operation from summer to winter and vice versa, and in which the individual heat exchange devices which are installed in the respective enclosures are manipulated by the tenant or other personnel in precisely the same manner to produce both heating and cooling effects.

A still further object is to provide a system of this sort which, when conditioned for summer operation for apartment cooling purposes, will automatically drain itself of all condensation which may take place under conditions of high humidity with the drainage taking place exteriorly of the individual enclosures so that there will be no contamination of the enclosures, either by moisture or unpleasant odors arising therefrom.

The provision of a cooling, dehumidifying and heating system which is extremely simple insofar as its component parts are concerned; one which is devoid of complicated electrical equipment and controls; one which for its basic components relies upon conventional heating installations but which eliminates the use of conventional floor-mounted radiator units thus contributing toward extreme economy of manufacture and installation; one which is comprised of relatively few moving parts and which, therefore, is unlikely to get out of order; one which materially reduces the cost of central heating and cooling systems; one which requires little or no maintenance operation or attention on the part of the occupants of the building; one which is smooth and silent in its operation; one which may be operated at a relatively low cost; and one which otherwise is well adapted to perform the services required of it are further desirable features which have been borne in mind in the production and development of the present invention.

Other objects and advantages of the invention, not at this time enumerated, will become more readily apparent as the nature of the invention is better understood.

With these and other objects in view which will become more readily apparent as the nature of the invention is better understood, the same consist in the novel construction, combination, and arrangement of parts shown in the accompanying single sheet of drawing forming a part of this specification.

In this drawing:

Fig. 1 is a fragmentary vertical sectional view taken through a typical inhabitable enclosure of the apartment dwelling variety showing the improved air cooling, dehumidifying and heating system and apparatus of the present invention operatively installed therein, with the system functioning for cooling purposes as in summer operation thereof;

Fig. 2 is a schematic sectional view similar to Fig. 1, showing the system functioning for heating purposes as during winter operation;

Fig. 3 is a sectional view taken substantially along the line 3—3 of Fig. 1; and Fig. 4 is a sectional view taken substantially along the line 4—4 of Fig. 3.

Referring now to the drawings in detail wherein one form of the present invention is shown as being applied to the air conditioning of a typical apartment building, the building is designated in its entirety at 10, only a fragmentary portion of the building in the vicinity of the apparatus which comprises the present air conditioning system being shown. One of the building walls 12, preferably an inside wall, forms a part of a generally rectangular ventilating shaft 14, such a shaft being conventional and usually being disposed in the masonry of the building. The shaft 14 may constitute one of several such shafts associated with the building 10. The outer walls 16 and the side walls 18 and 20 of the shaft 14 (Fig. 3) extend from the basement floor 22 to the roof 24 of the building, so that the shaft is adequately supported from the ground. The rectangular interior of the shaft 16 affords a passageway 26 for air, and the upper end of this passageway 26 communicates through an opening 28 in the roof 24 with an air duct 30 which provides a horizontal passageway 32 affording an air inlet 34, the nature and function of which will be made clear presently.

The building 10 selected for illustration has three floors including the ground floor 36 which also comprises the ceiling of the basement 38, a second floor 40 and a third floor 42. The layout or plan of the various floors 36, 40 and 42 may be substantially identical, and in Figs. 3 and 4, a typical apartment plan has been shown. This apartment plan is, of course, purely exemplary and it will be understood that numerous other apartment plans are contemplated and the present air conditioning system may, with or without modification, be adapted for use in connection with a wide variety of apartment enclosure interiors.

A conventional hot water heater or boiler 50 is operatively mounted on the basement floor 22 and has the usual main lead-in and lead-out hot water pipes 52 and 54, respectively, associated therewith. The lead-out pipe 52 is connected to the inlet side 56 of a water pump 58 and the outlet side 60 of the pump 58 is connected to a pipe 62 which extends to one branch of a T-fitting 64. A second branch of the T-fitting 64 communicates with a pipe 66 and this latter pipe communicates with a vertical riser or manifold pipe 68 which extends upwardly through the passageway 26 in the ventilating shaft 14 to a point adjacent the roof 24 of the building. Branch lead-in conduits 70 extend from the riser pipe 68 through openings 72 into the various apartment enclosures 74 and are operatively connected to heat exchange devices 76 in a manner and for a purpose that will be made clear presently. The pipe 54 at the boiler 50 communicates with a three-way valve which has been schematically shown at 78 and which is of conventional construction. The valve 78 communicates through a pipe section 80 with a second vertical pipe 82 extending upwardly through the passageway 26 to a point near the roof 24 and having associated therewith return branch conduits 84 leading from the various heat exchange devices 76. The pipe 82 constitutes the return pipe leading to the boiler 50. The arrangement of parts thus far described is, in the main, conventional in connection with the construction of modern apartment house dwellings and no claim is made herein to any novelty associated with the use of a basement-installed boiler from which there extends a vertical riser and a return pipe leading to heat exchange devices located in the various inhabitable enclosures or apartments of the building. The novelty of the present application resides rather in the combination of structure which will hereinafter be more fully described and its operation set forth.

As shown in Figs. 1 and 2, the T-fitting 64 has a branch which communicates with a pipe section 90 leading to a conventional water cooler or chiller 92. A pipe section 94 connects the water cooler 92 to the three-way valve 78. It will be seen, therefore, that by manipulation of the valve 78, either hot water may be forced by the pump 58 from the boiler 50 through the system including the various heat exchange devices 76, or chilled water may be circulated by the pump 58 through the system from the water cooler 92. The hot water circuit extends from the boiler 50 through pipe 52, pump 58, pipes 62, 66, 68, branch conduits 70, heat exchange devices 76, branch pipes 84, pipes 82, 80, valve 78 and pipe 54 back to the boiler 50. The circuit for chilled water extends from the water cooler 92 through pipes 90, 66, 68, branch pipes 70, heat exchange devices 76, branch pipes 84, pipes 82, 80, valve 78 and pipe 94 back to the water cooler 92.

In the installation of conventional heating systems, it is invariably the practice to heavily insulate the riser pipe 68 within the passageway 26 and similarly to heavily insulate the return pipe 82, the insulation usually consisting of a relatively thick massive sheath of a commercial pipe insulation stock. It is customary also to apply insulation to portions of the branch conduits 70 and 84 leading to the heat exchange radiators within the apartment enclosures 74. One of the principal features of the present invention resides in the fact that the vertical pipes 68 and 82, as well as the various branch pipes 70 and 84, are left entirely uninsulated within the passageway 26. These pipes are then employed as heat exchange devices whereby, in the case of winter operation when hot water is circulated through the pipes, heat may be imparted to the ambient air within the passageway 26 by radiation and convection and, whereby, during winter operation when chilled water is circulated in the system, heat from the ambient air within the passageway 26 may be assimilated. To further enhance the heat exchange characteristics of the pipes 68 and 82, the upper regions thereof may be provided with a series of radiating fins such as have been shown at 100.

According to the present invention, by effecting heat exchange between the water flowing in the system and the ambient air in the passageway 26, whether for cooling such air or for heating the same, this air is available for forcible projection into the various inhabitable enclosures which comprise the individual apartments to precondition the air within the enclosures and thus, to a large extent, enhance the effective operation of the various heat exchange devices 76. Obviously, where warm air is initially supplied to the enclosure 74 from the passageway 26, the amount of thermal heat exchange required to be performed by the various heat exchange units 76 will be lessened and, at the same time, a more uniform heating of the enclosures will take place. Since no portion of the individual enclosures is subject to the admission of cold outside air, the presence of localized cold drafts in the enclosures will be eliminated. The air which is introduced into the various enclosures 74 is pulled into the passageway 26 through the air inlet opening 34 by means of a fan and motor assembly which has been schematically shown in Figs. 1 and 2 and designated in its entirety at 102. This air enters the passageway 32 and passes through the opening 28, a filter element 103, and travels downwardly in the passageway 26, either assimilating heat from the various radiating fins 100 in the case of winter operation when hot water is circulated through the system, or yielding up heat to these fins in the case of summer operation when cold water is circulated through the system. The thus preconditioned air then enters the various enclosures 74 through the openings 72.

During summer operation when chilled water is circulated in the system, the various pipes within the passageway 26 are subject to condensation, particularly when the ambient air is of relatively high humidity. This moisture will travel down the various pipes and, in order to dispose of it, a suitable drip pan 104 adjacent the bottom of the shaft communicates with a drip pipe 106 leading to a drain opening 108 in the basement floor 22.

As shown in Figs. 1 and 2, the various pipes leading to and from the boiler 50 and air chilling device 92 may be at least partially enclosed in an overhead conduit 109 which extends along the basement ceiling 36 and which communicates with the lower end of the shaft 14. The details of the conduit 109 are not shown but it will be understood, of course, that sutiable access openings may be provided in the same whereby access to the valve 78 may be had or to the various fittings for purposes of inspection, replacement of parts or repair.

If desired, the fan and motor assembly 102 may be disabled and the entrance to the passageway 32 closed by means of a damper 111 and an alternative fan and motor assembly 113 may be energized to draw air into the conduit 109 and passageway 26 from a ground stack (not shown) or other source of outside air. A damper 115 may be employed to seal off the conduit 109 when the assembly 113 is disabled and the fan and motor assembly 102 is in use. Under certain circumstances, it may be found expedient to utilize both fan and motor assemblies 102 and 113 simultaneously, in which case both dampers 111 and 115 will remain open.

Referring now to Figs. 3 and 4, a typical plan of one of the apartment enclosures 74 has been illustrated. Vertical walls 110 divide the enclosure into various comparments including a living room, bedroom, kitchen, bath, and a back entry-way or hall leading to the other compartments. The function of the various compartments has been legended in Fig. 3 and the compartments have been designated at 112, 114, 116, 118 and 120 in the order named. A corridor 122 spans the living room 112 and bedroom 114 and leads to other similarly divided adjacent enclosures 74.

As best seen in Fig. 4, the entry-way or hall 120 is provided with a sub-ceiling 124 spaced below the ceiling 126 of the enclosure 74 and defining, in combination with certain of the walls 110, a compartment or a plenum chamber 127 having communication with the passageway 26 through one of the openings 72. The plenum chamber 127 is provided with side walls 128 and 130 dividing the same from the kitchen enclosure 116 and bathroom enclosure 118. The side wall 128 is louvered as at 132 so that air may escape from the plenum chamber 127 and enter the kitchen enclosure 116. The side wall 128 is also louvered as at 134 to permit air to pass from the chamber 127 to the living room enclosure 112. The side wall 110 is louvered as at 136 so that air may pass from the chamber 127 to the bathroom enclosure 118. The chamber 127 is provided with a front wall 138 which is louvered as at 140 for the passage of air from the chamber 127 to the bedroom enclosure 114.

As shown in Figs. 3 and 4, the wall which divides the kitchen 116 from the hall 120 may be provided with a grille 142 and the wall which divides the bathroom 118 from the hall 120 may be provided with a grille 144, the two grilles 142 and 144 constituting return passages for recirculation of air within the enclosures 116 and 118. An additional grille 146, provided in the bottom wall 124 of the plenum chamber 127, affords recirculation of air through the bedroom 114.

Each of the heat exchange devices 76 has associated therewith a motor driven fan assembly designated in its entirety at 150. The various fan assemblies 150 serve to draw air from the passageway 26 in the shaft 16 and to create a region of relatively high pressure in the forward region of the plenum chamber whereby the air, after having been pulled through the actual heat exchange coils may be forced through the various louvered openings into their respective compartments as previously described. It is to be noted that the various fan assemblies 150 augment the action of the fan assembly 102 in causing the air to be drawn inwardly through the passageways 32 and 26, and, under certain circumstances, when a given fan assembly 150 is not in operation, the action of the fan assembly 102 may to a certain extent cause an appreciable amount of air to be forced into the plenum chamber 126. However, for full effectiveness, the various fan assemblies 150 will be set into operation.

The invention is not to be limited to the exact construction of the air conditioning system illustrated herein as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. In an air conditioning system of the character described, the combination with a multi-story building having a basement, superimposed floors, a ceiling above each floor and defining, in combination with the floor immediately therebeneath, an inhabitable enclosure, a roof above the uppermost ceiling and having an opening therein, a horizontal duct on said roof communicating at one end with said opening and at its other end with the ambient atmosphere, and a structural shaft extending upwardly through the building from the basement ceiling through said floors and communicating with the horizontal duct through said opening in the roof, said shaft providing a vertical air passageway, an uninsulated exposed metal water riser pipe and an uninsulated exposed metal water return pipe extending upwardly in said shaft from the basement to a region adjacent the uppermost ceiling of the building, there being a lateral opening in said shaft at each enclosure-level immediately below the adjacent ceiling and establishing communication between the shaft and the enclosure, means including a sub-ceiling slightly below the level of each ceiling defining a plenum chamber in communication with the adjacent lateral enclosure, a heat exchange device in each plenum chamber, branch pipes extending through said lateral openings and connecting the heat exchange devices with the water riser and water return pipes, partition walls dividing each enclosure into a plurality of rooms over which the adjacent ceiling extends, said plenum chamber having side walls provided with air openings therethrough establishing communication between the plenum chamber and the adjacent rooms, grille devices in said latter openings, said water riser and water return pipes having a series of heat exchange fins thereon in the upper regions of said structural shaft immediately below the opening in said roof, a blower in each plenum chamber having its suction side operatively connected to the adjacent lateral opening in the structural shaft, a blower operatively connected to said shaft passageway for forcing air through the passageway in heat exchange relation to said water riser and water return pipes for distribution to said plenum chambers through said lateral openings for subsequent distribution to said rooms, and a water heater disposed in said basement and having lead-in and lead-out pipes operatively connected to said water return and water riser pipes respectively, and a control valve in said lead-out pipe.

2. In an air conditioning system of the character described, the combination set forth in claim 1 including, additionally, a water cooler disposed in said basement, said water cooler having lead-in and lead-out pipes, and valve means for selectively connecting said lead-out pipes to said water riser pipe while simultaneously selectively connecting said lead-out pipes to said water return pipe.

References Cited in the file of this patent

UNITED STATES PATENTS

| | | |
|---|---|---|
| 504,961 | Brady | Sept. 12, 1893 |
| 509,332 | Smith | Dec. 21, 1893 |
| 873,450 | Muller | Dec. 10, 1907 |
| 963,255 | Sheldon | July 5, 1910 |
| 1,984,949 | Smith | Dec. 18, 1934 |
| 2,282,210 | Plum | May 5, 1942 |
| 2,588,723 | Herman | Mar. 11, 1952 |